(12) United States Patent
Castellani et al.

(10) Patent No.: US 10,696,824 B2
(45) Date of Patent: Jun. 30, 2020

(54) HIGH-PERFORMANCE TYRE

(71) Applicants: PIRELLI TYRE S.P.A., Milan (IT); POLITECNICO DI MILANO, Milan (IT)

(72) Inventors: Luca Castellani, Milan (IT); Thomas Hanel, Milan (IT); Enrico Albizzati, Milan (IT); Antonio Proto, Fisciano (IT); Carmine Capacchione, Fisciano (IT); Maurizio Galimberti, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 15/721,520

(22) Filed: Sep. 29, 2017

(65) Prior Publication Data

US 2018/0051118 A1   Feb. 22, 2018

Related U.S. Application Data

(63) Continuation of application No. 15/561,510, filed as application No. PCT/IB2016/052382 on Apr. 27, 2016.

(30) Foreign Application Priority Data

Apr. 24, 2015   (IT) .............................. MI2015A0589

(51) Int. Cl.
*C08F 212/00* (2006.01)
*C08L 9/06* (2006.01)
(Continued)

(52) U.S. Cl.
CPC .............. *C08L 9/06* (2013.01); *B60C 1/0016* (2013.01); *C08F 212/08* (2013.01); *C08F 297/06* (2013.01); *C08F 297/08* (2013.01); *C08L 53/02* (2013.01); *C08K 3/04* (2013.01); *C08K 3/36* (2013.01); *C08K 5/548* (2013.01); *C08L 25/10* (2013.01); *C08L 2205/035* (2013.01)

(58) Field of Classification Search
CPC ........... C08F 212/08; C08K 3/04; C08K 3/36; C08K 5/548; C08L 9/06; C08L 25/10
See application file for complete search history.

(56) References Cited

U.S. PATENT DOCUMENTS 3,496,985 A   2/1970   Werner et al.
3,903,019 A   9/1975   Hargis et al.
(Continued)

FOREIGN PATENT DOCUMENTS

CN   103214621 A   7/2013
DE   10309837 A1   9/2004
(Continued)

OTHER PUBLICATIONS

JP-62134243_Jun. 1987_English Translation.*
(Continued)

*Primary Examiner* — Michael L Leonard
(74) *Attorney, Agent, or Firm* — Steinfl + Bruno LLP

(57) ABSTRACT

A (iso-styrene/trans-butadiene): diene-terminated copolymer is described which includes (i) a polymeric block of styrene-butadiene consisting of a random sequence of butadiene in trans conformation and styrene in isotactic configuration, and (ii) a terminal polymeric block consisting of a sequence of one or more dienic monomers.

6 Claims, 1 Drawing Sheet

(51) Int. Cl.

| | |
|---|---|
| *B60C 1/00* | (2006.01) |
| *C08F 297/06* | (2006.01) |
| *C08L 53/02* | (2006.01) |
| *C08F 212/08* | (2006.01) |
| *C08F 297/08* | (2006.01) |
| *C08K 3/04* | (2006.01) |
| *C08L 25/10* | (2006.01) |
| *C08K 3/36* | (2006.01) |
| *C08K 5/548* | (2006.01) |

(56) References Cited

U.S. PATENT DOCUMENTS

| | | |
|---|---|---|
| 4,112,210 A | 9/1978 | Dezarauz |
| 4,129,705 A | 12/1978 | De Zarauz |
| 4,669,518 A | 6/1987 | Hargis et al. |
| 4,933,401 A | 6/1990 | Hattori et al. |
| 5,100,965 A | 3/1992 | Hsu et al. |
| 5,292,820 A * | 3/1994 | Coolbaugh ............ C08F 8/00 525/102 |
| 5,317,062 A | 5/1994 | Rodgers et al. |
| 5,753,579 A | 5/1998 | Jalics et al. |
| 6,103,842 A | 8/2000 | Halasa et al. |
| 6,429,245 B1 | 8/2002 | Francik et al. |
| 6,581,659 B1 | 6/2003 | Zanzig et al. |
| 6,627,715 B2 | 9/2003 | Halasa et al. |
| 6,872,772 B2 | 3/2005 | Steiner et al. |
| 6,889,737 B2 | 5/2005 | Weydert et al. |
| 7,048,023 B2 | 5/2006 | Herberger et al. |
| 8,937,130 B2 | 1/2015 | Sasajima et al. |
| 2004/0039104 A1 | 2/2004 | Bates et al. |
| 2004/0177907 A1 | 9/2004 | Steiner et al. |
| 2006/0241213 A1 | 10/2006 | Galimberti et al. |
| 2010/0152387 A1 * | 6/2010 | Steininger ............ C08F 10/00 525/107 |
| 2018/0044455 A1 | 2/2018 | Castellani et al. |
| 2018/0057668 A1 | 3/2018 | Castellani et al. |
| 2018/0079257 A1 | 3/2018 | Castellani et al. |
| 2018/0215202 A1 | 8/2018 | Castellani et al. |

FOREIGN PATENT DOCUMENTS

| | | | |
|---|---|---|---|
| EP | 1231079 A1 | 8/2002 | |
| EP | 1593528 A1 | 11/2005 | |
| EP | 1681333 A1 | 7/2006 | |
| EP | 2239299 A1 | 10/2010 | |
| JP | 62134243 | * 6/1987 | ............ C08F 112/08 |
| JP | S62134243 A | 6/1987 | |
| WO | 2005/097887 A1 | 10/2005 | |
| WO | 2010/006655 A1 | 1/2010 | |
| WO | 2012/069335 A1 | 5/2012 | |
| WO | WO-2012/069335 | * 5/2012 | ............ C08F 212/08 |
| WO | 2016/170522 A1 | 10/2016 | |
| WO | 2016/170523 A1 | 10/2016 | |

OTHER PUBLICATIONS

Capacchione, C., et al. "Living, Isoselective Polymerization of 4-methyl-1,3-pentadiene and Styrenic Monomers and Sythesis of Highly Stereoregular Block Copolymers via Sequential Monomer Addition." *Macromolecules*44, 7940-7947, (Sep. 2011). 8 pages.

International Search Report for International Application No. PCT/IB2016/052381 filed Apr. 27, 2016 on behalf of PIRELLI TYRE S.P.A. dated Aug. 11, 2016. 3 pages.

International Search Report for International Application No. PCT/IB2016/052382 filed Apr. 27, 2016 on behalf of PIRELLI TYRE S.P.A. dated Sep. 8, 2016. 3 pages.

Longo, P., et al. "Chemoselectivity in 4-methyl-1,3-pentadiene polymerization in the presence of homogeneous Ti-based catalysts." *Macromolecular Rapid Communications*18, 183-190 (Feb. 1997). 8 pages.

Proto, A., et al. "Living, Isoselective Polymerization of Styrene and Formation of Stereoregular Block Copolymers via Sequential Monomer Addition." *Macromolecules*43, 5919-5921, (Jun. 2010). 3 pages.

Written Opinion for International Application No. PCT/IB2016/052381 filed Apr. 27, 2016 on behalf of PIRELLI TYRE S.P.A. dated Aug. 11, 2016. 4 pages.

Written Opinion for International Application No. PCT/IB2016/052382 filed Apr. 27, 2016 on behalf of PIRELLI TYRE S.P.A. dated Sep. 8, 2016. 4 pages.

Non-Final Office Action for U.S. Appl. No. 15/717,866, filed Sep. 27, 2017, on behalf of PIRELLI TYRE S.P.A. dated Sep. 26, 2018, 11 pages.

Young, R. J. et al. "Introduction to Polymers", *CRC Press Taylor & Francis Group*; Third Edition; Chapter 6, p. 147 (May 2011). 3 pages.

Cazzaniga L. et al "Synthesis and Characterization of Isotactic Polylstyrene/Polybutadiene Block Copolymers," 24 *Macromolecules*5817 (1991).

International Preliminary Report on Patentability for International Application No. PCT/IB2016/052381 filed on Apr. 27, 2016 on behalf of PIRELLI TYRE S.P.A dated Oct. 24, 2017 5 pages.

International Preliminary Report on Patentability for International Application No. PCT/IB2016/052382 filed on Apr. 27, 2016 on behalf of PIRELLI TYRE S.P.A. dated Oct. 24, 2017 5 pages.

Non-Final Office Action for U.S. Appl. No. 15/560,993, filed Sep. 22, 2017 on behalf of PIRELLI TYRE S.F.A. dated Jun. 18, 2019 12 pages.

Non-Final Office Action for U.S. Appl. No. 15/561,510, filed Sep. 25, 2017 on behalf of PIRELLI TYRE S.P.A dated Jun. 19, 2019 11 pages.

Non-Final Office Action for U.S. Appl. No. 15/717,866, filed Sep. 27, 2017 on behalf of PIRELLI TYRE S.P.A. dated Feb. 5, 2019. 8 pages.

Priddy D. "Styrene Plastics," 23 *Kirk-Othmer Encyclopedia of Chemical Technoiogy*358, published online2006.

"Molecular Weight and End Group Control of Isotactic Polystyrene Using Olefins and Nonconjugated Diolefins as Chain Transfer Agents", Gall et al. Macromolecules 2008, 41, 1627-1633.

Corrected Notice of Allowability for U.S. Appl. No. 15/561,510 filed on Sep. 25, 2017 on behalf of Pirelli Tyre S.P.A. dated Nov. 27, 2019 3 pages.

Final Office Action for U.S. Appl. No. 15/560,993 filed on Sep. 22, 2017 on behalf of Pirelli Tyre S.P.A. dated Sep. 27, 2019, 8 pages.

Non-Final Office Action for U.S. Appl. No. 15/717,868 filed Sep. 27, 2017, on behalf of Pirelli Tyre S.P.A. dated Aug. 27, 2019, 8 pages.

Notice of Allowance for U.S. Appl. No. 15/561,510 filed on Sep. 25, 2017 on behalf of Pirelli Tyre S.P.A. dated Sep. 30, 2019, 9 pages.

* cited by examiner

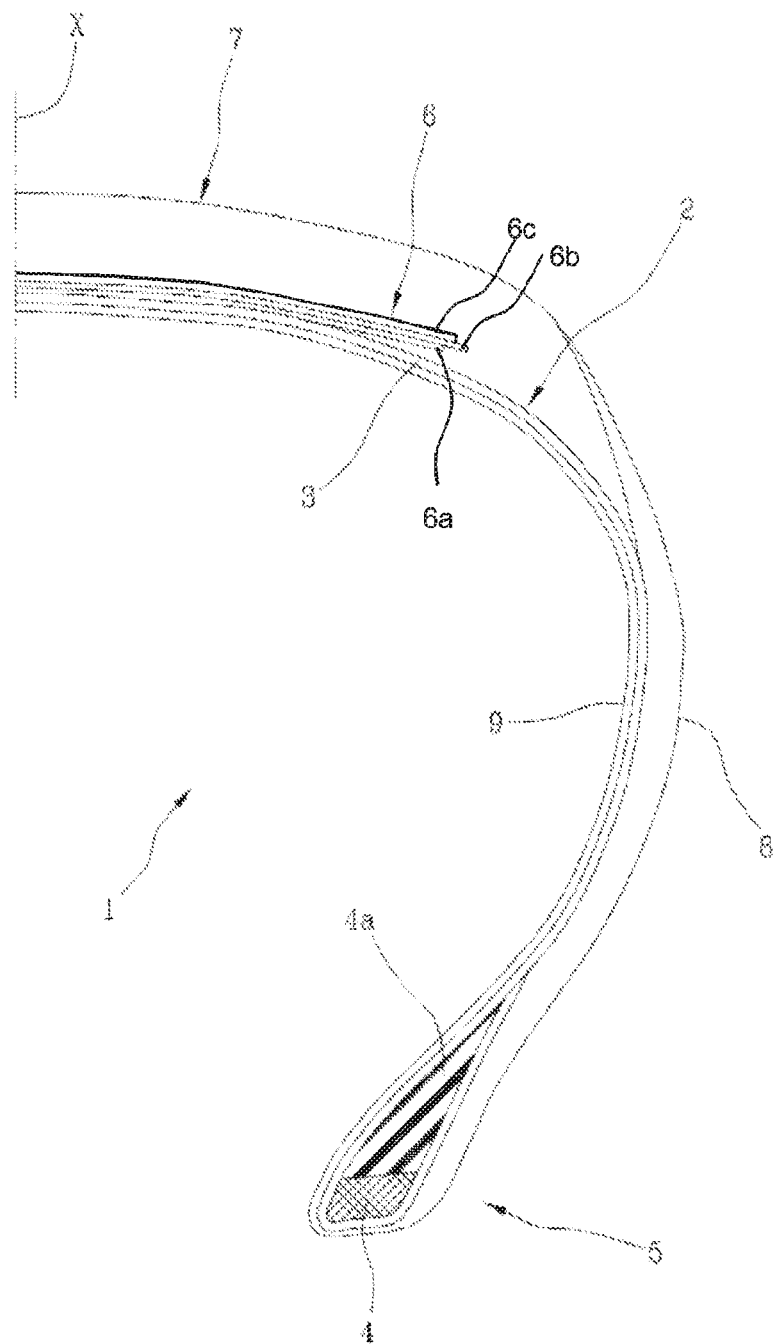

HIGH-PERFORMANCE TYRE

CROSS REFERENCE TO RELATED APPLICATIONS

The present application is a continuation of U.S. patent application Ser. No. 15/561,510, filed on Sep. 25, 2017, which is the U.S. national stage of International Patent Application PCT/IB2016/052382 filed internationally on Apr. 27, 2016, which, in turn, claims priority to Italian Patent Application No. MI2015A000589 filed on Apr. 24, 2015, the contents of all of which are incorporated by referenced in their entireties.

FIELD OF THE INVENTION

The present invention relates to a high-performance tyre for the wheels of vehicles, in particular motor vehicles. In particular, the present invention relates to a high-performance tyre which comprises a tread including a crosslinked elastomeric material obtained by crosslinking a crosslinkable elastomeric composition.

PRIOR ART

A number of catalysts and processes for producing polymers and copolymers are described in documents U.S. Pat. Nos. 3,903,019, 4,112,210, 4,129,705, 4,933,401, 5,100,965, 5,753,579, 6,103,842 and 6,627,715.

The use of polymers and copolymers for producing at least one tyre component is described in documents U.S. Pat. Nos. 4,669,518, 5,317,062, 6,429,245, 6,581,659, 6,872,772, 6,889,737, 7,048,023, 8,937,130, US 2004/0039104, US 2004/0177907, EP 1 593 528, WO 2010/006655 and WO 2012/069335.

SUMMARY OF THE INVENTION

One of the objectives of research in the field of tyres is that of increasing the driving safety together with increasing the overall performances. High-performance tyres are designed to be used at high speed and must therefore ensure high grip under all conditions, above all during changes in direction at high speed and on slippery asphalt.

High-performance tyres, commonly known as "HP" and "UHP" ("High Performance" and "Ultra-high performance") are, in particular, but not exclusively, those belonging to the classes "T", "U", "H", "V", "ZR", "W" and "Y" according to the E:T:R:T:O classification, suitable for maximum speed above 190 km/h and up to over 300 km/h, for which the working performances at high temperatures are critical, and constitute one of the most important factors in their design and production.

Typically, the elastomeric compositions used for the production of high-performance tyre treads may include large amounts of styrene-butadiene copolymers (SBR).

High-performance tyres are subjected, during use, in particular during driving and manoeuvring at high speed, to an appreciable increase in temperature, which may result in weakness in the tread and have a negative impact on the grip. Consequently, it is necessary to ensure consistency of the mechanical properties and the performances also when the temperature of the tyre increases.

At the same time, high-performance tyres must ensure optimum performances also under non-extreme driving conditions.

The rigidity and hysteresis of the elastomeric material introduced into the tyre tread has an influence on its behaviour.

High hysteresis accompanied by high values for the mechanical properties may give the tyre tread high grip and high resistance to abrasion and to laceration to the benefit of the handling in even more demanding manoeuvres, but may lead to high rolling resistance. Conversely, a tread with little hysteresis ensures low rolling resistance, but, on the other hand, the grip is reduced.

High hysteresis at low temperatures ensures good road holding on wet terrain, whereas a high hysteresis value at high temperatures ensures good road holding when the tyre is used under particularly severe driving conditions.

During driving under non-extreme conditions, to limit the rolling resistance, and consequently to obtain low fuel consumption, it is advantageous for the hysteresis of the elastomeric material included in the tyre tread to be as low as possible at moderate temperatures.

Finally, the tread should show reduced thermoplasticity, in other words it should remain sufficiently rigid as the working temperature increases.

Since it does not seem possible to obtain the conflicting characteristics described above, by using a mixture based on only one elastomeric polymer, for the purposes of obtaining a tyre tread that has optimum characteristics from all viewpoints, elastomeric materials for tyre treads were prepared using mixtures of elastomeric polymers and/or copolymers with various physicochemical characteristics.

Typically, increased hysteresis may be obtained by introducing resins into the tread mixture. The resins do not crosslink with the elastomeric polymers and/or copolymers which form the base elastomeric composition, consequently leading to degradation of the static-mechanical properties of the elastomeric composition. It is therefore possible for laceration of the tyre tread to take place, above all in the case of severe effort, even after a non-prolonged used of the same.

A different approach followed is that of introducing materials that have a glass transition at higher temperature values than those of the elastomers into the elastomeric mixture for the preparation of the tread.

For example, for a typical mixture comprising styrene-butadiene rubber (SBR), raising the glass transition of the tread mixture may be obtained by increasing the content of styrene used in the mixture or by adding thermoplastic polymers or resins characterized by high transition temperatures, either of thermodynamic type such as the melting point, or of kinetic type such as the glass transition.

The presence of high percentages of styrene during the polymerization process promotes the formation of block copolymers, i.e. copolymers in which are present ten or more consecutive styrene units, which may have the typical glass transition temperature of polystyrene (+100° C.). These block copolymers are thermoplastic and therefore do not appear to be suitable for producing tyre treads, since their mechanical properties and the abrasion resistance would be drastically compromised.

Unsaturated thermoplastic polymers have the advantage of crosslinking with polymers and/or copolymers that form the base elastomeric composition, but, on the other hand, do not considerably increase the hysteresis of the finished tyre tread since they do not have a high content of styrene. In this case, the finished tyre tread will have better resistance to laceration, but reduced grip, when compared with a tyre tread in which resins are added.

In an attempt simultaneously to improve the grip and durability properties of the finished tyre tread, low molecular weight (LMW) resins and polymers are often used together. However, the combination of these materials does not make it possible fully to solve the problem of the resistance to wear (abrasion) of the tyre tread.

The Applicant thus considers that there is still a great need for mixtures for high-performance tyre treads which make it possible to reconcile the characteristics described previously, in particular high hysteresis at low and high temperatures, but with optimum values at intermediate temperatures to reduce the rolling resistance, and better rigidity at high temperature, but with less thermoplastic behaviour of the tread with the temperature, at the same time maintaining optimum values for the static-mechanical properties, which ensure resistance to laceration and reduction of abrasion.

The Applicant has surprisingly found that a copolymer of stereoregular styrene-butadiene (in particular, with butadiene in trans conformation and styrene in isotactic configuration) with a terminal polymeric block consisting of a sequence of one or more dienic monomers, may be advantageously used in the elastomeric composition used in the production of a tyre tread to overcome the abovementioned drawbacks.

Preferred examples of dienic monomers are conjugated or isolated dienic monomers, for instance isoprene, 1,4-pentadiene, 1,4-hexadiene, 1,5-hexadiene, cyclopentadiene, 1-vinylcyclopentene, 2-vinylcyclohexene, 4-vinylcyclohexene. The terminal polymeric block preferably consists of a sequence of concatenated dienic units of between 3 and 100.

In the context of the present description, and in the claims that follow, a copolymer of (styrene-butadiene)-diene with a styrene-butadiene block consisting of a butadiene sequence in trans conformation and styrene in isotactic configuration, and with a terminal polymeric block consisting of a sequence of one or more dienic monomers is indicated by the term (iso-styrene/trans-butadiene): diene-terminated copolymer.

The term "trans conformation of butadiene" means the geometric arrangement of butadiene monomers in which the two single bonds of chain propagation are arranged on opposite sides with respect to the central double bond, as represented in the following structural formula.

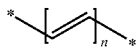

The term "isotactic configuration of styrene" means the isotactic arrangement of styrene monomers, i.e. the arrangement in which the carbon atoms bearing the styrene groups have the same relative configuration and the styrene groups have the same spatial arrangement relative to the plane, as represented in the following structural formula.

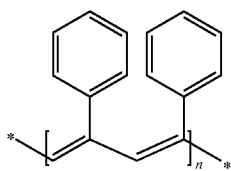

The butadiene and styrene monomers are arranged in random mode in the polymer chain whereas the dienic monomers are arranged in blocks at one or both the ends of the chain formed by butadiene and styrene monomers, as represented, for illustrative but non-limiting purposes, in the following graphic representation, in which D indicates the dienic monomers, B indicates the butadiene monomer and S indicates the styrene monomer.

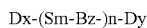

in which x is an integer from 0 to 100, y is an integer from 3 to 100 and m and z are an integer from 1 to 4, and n is an integer that is variable as a function of the molecular weight.

The Applicant has surprisingly found that the use of a copolymer having the abovementioned characteristics in the elastomeric composition used in the production of a tyre tread makes it possible to overcome the described drawbacks. In particular, the use of a copolymer having the abovementioned characteristics in the elastomeric composition used in the production of a tyre tread ensures a high supply of styrene, crosslinks with the base elastomeric composition and is solubilized therein.

Advantageously, the use of an iso-styrene-trans-butadiene: diene-terminated copolymer in the elastomeric composition used in the production of a tyre tread makes it possible to obtain a tyre tread characterized by reduced thermoplasticity while maintaining high values for the mechanical characteristics at rupture and/or high elongation, with respect to mixtures in which conventional oils and resins are used, and high rigidity at high temperatures together with high hysteresis values at low and high temperatures.

A general decrease in the sensitivity of the tyre tread to the effects of temperature is thus obtained, above all to heating. In addition, the tyre tread shows less weakness, greater consistency of the performances and improved resistance to laceration, even when subjected to severe effort, for example to high speed and/or during direction-change manoeuvres.

The present invention thus relates in a first aspect to a tyre for vehicle wheels, comprising:
a carcass structure;
a tread band applied in radially outer position with respect to said carcass structure;
characterized in that said tread band comprises a crosslinked elastomeric material obtained by crosslinking a crosslinkable elastomeric composition, wherein said elastomeric composition comprises at least an (iso-styrene/trans-butadiene): diene-terminated copolymer.

Preferably, the copolymer that is useful in the present invention has a content of styrene higher than 40%, preferably higher than 50%, and more preferably higher than 60% by weight with respect to the total weight of copolymer.

Preferably, the copolymer that is useful in the present invention has a content of 1,4-butadiene (i.e. butadiene polymerized in positions 1-4) lower than 60%, preferably lower than 40%, and more preferably lower than 20% by weight with respect to the total weight of copolymer.

Preferably, the dienic monomer used to prepare the terminal polymeric block is selected from the group comprising conjugated or isolated dienic monomers, for instance isoprene, 1,4-pentadiene, 1,4-hexadiene, 1,5-hexadiene, cyclopentadiene, 1-vinylcyclopentene, 2-vinylcyclohexene, 4-vinylcyclohexene, and so on.

Terminal polymeric block may be a homopolymer of one of the abovementioned dienic monomers, or may be a copolymer of 2, 3 or more of the abovementioned dienic monomers. In addition, the terminal polymeric block may be indifferently produced at only one or at both ends of the polymer chain.

Advantageously, the dienic monomer used to prepare the terminal polymeric block is selected from the group comprising isoprene, 1,4-hexadiene, cyclopentadiene, and mixtures thereof.

Advantageously, the terminal polymeric block consists of a sequence of one or more dienic monomers comprising a number of concatenated dienic units of between 3 and 100, preferably between 5 and 75, and even more preferably between 10 and 50.

Preferably, the terminal polymeric block consists of polyisoprene with a stereoregular microstructure consisting mainly of 1,4-trans-isoprene (at least 70%).

Preferably, the terminal polymeric block represents less than 2%, more preferably less than 1%, by weight with respect to the total weight of copolymer. Advantageously, the weight of the terminal polymeric block consists of a value of between 0.1% and 0.5% by weight with respect to the total weight of copolymer.

Preferably, the copolymer that is useful in the present invention has a Tg value at the inflection point (inflection point Tg) of between −50° C. and +20° C. measured by DSC at 10° C./min.

The copolymer that is useful in the present invention may have a molecular weight of greater than or equal to 20 000 Da, preferably greater than or equal to 50 000 Da, more preferably greater than or equal to 100 000 Da, and even more preferably greater than or equal to 200 000 Da.

The copolymer that is useful in the present invention may have a molecular weight of less than or equal to 1 500 000 Da, preferably less than or equal to 1 250 000 Da, more preferably less than or equal to 1 000 000 Da, and even more preferably less than or equal to 900 000 Da.

Preferably, the copolymer that is useful in the present invention is present in the elastomeric composition in an amount of greater than 1 phr, preferably greater than 2 phr.

Preferably, the copolymer that is useful in the present invention is present in the elastomeric composition in an amount of less than 20 phr, preferably less than 15 phr.

Preferably, the copolymer that is useful in the present invention is present in the elastomeric composition in an amount of between 2.5 and 10 phr.

In a second aspect, the present invention relates to an (iso-styrene/trans-butadiene): diene-terminated copolymer, in which said copolymer consists of (i) a polymeric block of styrene-butadiene consisting of a random sequence of butadiene in trans conformation and styrene in isotactic configuration, and (ii) a terminal polymeric block consisting of a sequence of one or more dienic monomers.

Advantageously, the copolymer of the present invention may be obtained by solution copolymerization using a homogeneous catalyst having the general formula (I),

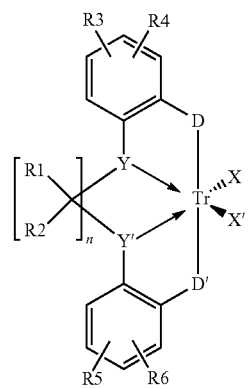

(I)

in which Tr is a transition metal,

X and X', equal or different each other, are a halogen atom,

R1 and R2, equal or different each other, are a H atom or a linear or branched alkyl group having from 1 to 10 carbon atoms, R3 to R6, equal or different each other, are a H atom or a linear or branched alkyl group having from 1 to 10 carbon atoms, or a linear or branched arylalkyl group having from 7 to 14 carbon atoms, Y and Y', equal or different each other, are an oxygen, sulfur, selenium or tellurium atom, or an NR7 or PR7 group, D and D', equal or different each other, are an oxygen, sulfur, selenium or tellurium atom, or an NR7 or PR7 group, R7 is a H atom or a linear or branched alkyl group having from 1 to 10 carbon atoms, n is an integer from 1 to 10.

Tr is preferably a transition metal selected from Ti, V, Cr, Mn, Fe, Co, Ni, Cu, Zr, Nb, Mo, Tc, Ru, Rh, Pd, Ce, Pr, Tb, Hf, Ta, W, Re, Os, Ir, Pt, more preferably from elements of the third group, and even more preferably from titanium and zirconium.

Preferably, X and X', equal or different each other, are a chloride or bromide atom, a linear or branched alkylaryl or arylalkyl group having from 1 to 10 carbon atoms in the alkyl part and from 6 to 14 carbon atoms in the aryl part, a linear or branched alkoxy group having from 1 to 10 carbon atoms. More preferably, X and X' are a chloride atom, a benzyl group or an isopropoxy group.

R1 and R2, equal or different each other, are preferably a hydrogen atom or linear or branched alkyl groups having from 1 to 6 carbon atoms, more preferably from 1 to 3 carbon atoms.

R3 to R6, equal or different each other, are preferably a hydrogen atom or a linear or branched alkyl group having from 1 to 6 carbon atoms, or a linear or branched arylalkyl group having from 7 to 10 carbon atoms.

Preferably, Y and Y' are the same and selected from oxygen and sulfur. More preferably, Y and Y' are both sulfur.

Preferably, D and D' are the same and are selected from oxygen and sulfur. More preferably, D and D' are both oxygen.

R7 is preferably a hydrogen atom or a linear or branched alkyl group having from 1 to 6 carbon atoms, more preferably from 1 to 3 carbon atoms.

n is preferably an integer from 1 to 5.

A third aspect of the present invention relates to a process for the copolymerization of styrene and butadiene with one or more dienic monomers, comprising (i) preparing a solution of said one or more dienic monomers in a suitable solvent, (ii) adding to said solution a homogeneous catalytic system, and (iii) adding to said solution said styrene and butadiene, in which said homogeneous catalytic system comprises the homogeneous catalyst having the abovementioned formula (I), and in which said copolymerization process provides the formation of an (iso-styrene/trans-butadiene): diene-terminated copolymer.

According to a preferred embodiment of the present invention, in the abovementioned formula (I), R4 and R6 are linked to the benzene ring in the ortho position with respect to the D and D' substituent and are represented by a linear or branched arylalkyl group having from 7 to 14 carbon atoms, and R3 and R5 are linked to the benzene ring in the para position relative to the D and D' substituent and are represented by a H atom or a linear or branched alkyl group having from 1 to 10 carbon atoms.

According to a more preferred embodiment of the present invention, the homogeneous catalyst is represented by following formula (1):

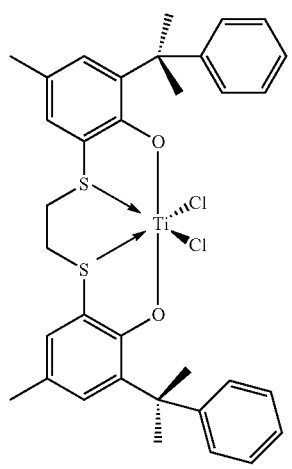

(1)

This catalyst has high catalytic activity and provides a high polymer yield (see, for example, those described by (i) P. Longo et al., "Chemoselectivity in 4-methyl-1,3-pentadiene polymerization in the presence of homogeneous Ti-based catalysts" Macromol. Rapid Commun. 18, 183-190 (1997), (ii) C. Capacchione et al., Macromolecules, 2011, 44, 7940-7947, "Living, Isoselective Polymerization of 4-methyl-1,3-pentadiene and Styrenic Monomers and Synthesis of Highly Stereoregular Block Copolymers via Sequential Monomer Addition", and (iii) A. Proto et al., Macromolecules, 2010, 43, 5919-5921, "Living, isoselective Polymerization of Styrene and Formation of Stereoregular Block Copolymers via Sequential Monomer Addition").

The abovementioned catalyst may be used in a process at room temperature and at normal atmospheric pressure, with appreciable advantages as regards costs and safety of the industrial process.

The copolymerization process is performed in a suitable solvent, preferably an aprotic solvent. Useful aprotic solvents are, for example, aliphatic hydrocarbons, such as pentane, hexane and cyclohexane, aromatic hydrocarbons, such as benzene, toluene, xylene and ethylbenzene, and halogenated hydrocarbons, such as dichloromethane. The preferred solvents are aromatic hydrocarbons, in particular toluene. Of course, mixtures of the abovementioned solvents may also be used.

The starting concentration of each comonomer added is generally set at a value of between 0.001 and 10 mol per litre, preferably between 0.01 and 8 mol per litre. The reaction temperature may be within a relatively wide range depending on the solvent used. The reaction temperature is usually between 0° C. and 100° C., and in particular preferably between 10° C. and 40° C. Preferably, the copolymerization process is performed at room temperature. The reaction is performed for a time period of between 15 minutes and 75 hours, preferably between 30 minutes and 30 hours. The reaction may be performed at pressures of between 0.1 and 10 atmospheres. The reaction is usually performed at pressures of between 0.5 and 5 atmospheres. Preferably, the copolymerization process is performed at atmospheric pressure.

The copolymerization process is preferably performed under controlled reaction conditions, i.e. with the exclusion of oxygen and moisture. If desired, an inert gas, such as argon or nitrogen, may be used. The polymerization reaction begins with the addition of the catalyst to the solution of the monomers. In particular, the catalyst is added to the solution of dienic monomer, preferably isoprene, 1,4-hexadiene, cyclopentadiene, or mixtures thereof, and styrene and butadiene are subsequently added concurrently. The catalyst may be added in unmodified form or in solution. The copolymerization process preferably comprises the use of an activator, for instance aluminoxanes and alkylaluminiums, as known in the art. Examples of suitable aluminoxane compounds include methylaluminoxanes (MAO), polymeric MAO (PMAO), ethylaluminoxane, diisobutylaluminoxane, and the like. Examples of suitable alkylaluminium compounds include triethylaluminium, diethylaluminium chloride, trimethylaluminium and triisobutylaluminium. The copolymerization process is stopped by adding a protic compound, for example a low molecular weight alcohol, such as methanol, ethanol and isopropanol, or by removing the solvent. The copolymer formed is generally solid and may be recovered from organic solvents via conventional techniques, such as decantation, filtration, centrifugation, and so on. The copolymer may then be purified via conventional techniques, such as washing or steam extraction, to remove the impurities, typically represented by volatile organic compounds.

In a preferred embodiment, the crosslinkable elastomeric composition comprises at least one high molecular weight elastomeric polymer, preferably a dienic elastomeric polymer, of natural or synthetic origin.

Preferably, said elastomeric polymer is present in an amount of 100 phr. For the purposes of the present description and of the following claims, the term "phr" indicates the parts by weight of a certain component of the crosslinkable elastomeric composition per 100 parts by weight of the elastomeric polymer.

Preferably, the said dienic elastomeric polymer is selected from the group comprising: cis-1,4-polyisoprene (natural or synthetic, preferably natural rubber), 3,4-polyisoprene, polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

The dienic elastomeric polymers described above may optionally be functionalized with suitable terminating or coupling agents.

Advantageously, the crosslinkable elastomeric composition typically also comprises at least one reinforcing filler which may be selected from those commonly used for crosslinked manufactured products, in particular for tyres, for instance: carbon black, silica and silicates, alumina, calcium carbonate, or mixtures thereof. Carbon black, silica and mixtures thereof are particularly preferred.

Preferably, said reinforcing filler may be present in the crosslinkable elastomeric composition in an amount generally less than 130 phr, preferably from 40 phr to 100 phr.

According to a preferred embodiment, said carbon black reinforcing filler may be selected from those with a surface area not less than 20 m²/g (determined by STSA—Statistical Thickness Surface Area—according to ISO 18852:2005).

According to a preferred embodiment, said silica reinforcing filler may be, for example, precipitated silica.

The silica reinforcing fillers that may advantageously be used according to the present invention preferably have a BET surface area of about 30 m²/g to 400 m²/g, more preferably from about 100 m²/g to about 250 m²/g, even more preferably from about 120 m²/g to about 220 m²/g. The pH of said silica reinforcing filler is generally from about 5.5 to about 7, preferably from about 5.5 to about 6.8.

Examples of silica reinforcing fillers that may be used according to the present invention and that are commercially available are the products known under the names Hi-Sil® 190, Hi-Sil® 210, Hi-Sil® 233, Hi-Sil® 243 available from PPG Industries (Pittsburgh, Pa.); or products known under the names Ultrasil® VN2, Ultrasil® VN3 from Evonik; or the products known under the name Zeosil® 1165MP from Rhodia.

Advantageously, the elastomeric composition comprises at least one silane coupling agent that is capable of interacting with the reinforcing filler and bonding it to the elastomeric polymer during the vulcanization.

The coupling agents that are preferably used are those based on silane, which may be identified, for example, by following structural formula (VI):

$$(R_2)_3Si—C_tH_{2t}—X \quad (VI)$$

in which the groups $R_2$, equal or different each other, are selected from: alkyl, alkoxy or aryloxy groups or from halogen atoms, on condition that at least one of the groups $R_2$ is an alkoxy or aryloxy group; t is an integer between 1 and 6 inclusive; X is a group selected from nitroso, mercapto, amino, epoxide, vinyl, imide, chloro, $—(S)_uC_tH_{2t}—Si—(R_2)_3$ or $—S—COR_2$, in which u and t are integers from 1 to 6, limits inclusive, and the groups $R_2$ are defined as reported above.

Coupling agents that are particularly preferred are: bis(3-triethoxysilylpropyl) tetrasulfide and bis(3-triethoxysilylpropyl) disulfide. Said coupling agents may be used in unmodified form or as a suitable mixture with an inert filler (for example carbon black) so as to facilitate their incorporation into the crosslinkable elastomeric composition.

Preferably, the coupling agent is added to the crosslinkable elastomeric composition in an amount of from 1% to 20% by weight, more preferably from 5% to 15% by weight and even more preferably from 8% to 12% by weight with respect to the weight of silica.

The above mentioned crosslinkable elastomeric composition may be vulcanized according to the known techniques, in particular with sulfur-based vulcanization systems commonly used for elastomeric polymers. To this end, after one or more phases of thermomechanical processing, a sulfur-based vulcanizing agent is incorporated into the composition together with vulcanizing accelerators. In the final processing phase, the temperature is generally maintained below 120° C. and preferably below 100° C., so as to avoid any undesired pre-crosslinking.

The vulcanizing agent more advantageously used is sulfur or molecules containing sulfur (sulfur donors), with vulcanization activators, accelerators and retardants, which are known to those skilled in the art.

Activators that are particularly effective are zinc compounds, and in particular ZnO, zinc salts of saturated or unsaturated fatty acids, for instance zinc stearate, which are preferably formed in situ in the elastomeric composition from ZnO and fatty acids. Useful activators may also be oxides or inorganic salts of Fe, Cu, Sn, Mo and Ni as described in patent application EP 1 231 079. Stearic acid is typically used as activator with zinc oxide.

Said vulcanization activators are preferably used in the crosslinkable elastomeric composition in an amount from about 0.5 phr to about 10 phr, more preferably from 1 phr to 5 phr. Accelerators that are commonly used may be selected from: dithiocarbamates, guanidine, thiourea, thiazoles, sulfenamides, thiourams, amines, xanthates, or mixtures thereof.

The vulcanization retardants that are commonly used may be selected, for example, from: urea, N-cyclohexyl-2-benzothiazolyl sulfenamide, N-cyclohexylphthalimide, N-cyclohexylthiophthalimide, N-nitrosodiphenylamine, or mixtures thereof.

Said vulcanization retardants are optionally used in the crosslinkable elastomeric composition in an amount of less than 1 phr, more preferably less than 0.5 phr and even more preferably from about 0.1 phr to about 0.3 phr.

The crosslinkable elastomeric composition may comprise other additives commonly used on the basis of the specific application for which the composition will be used. For example, the following may be added to the elastomeric composition: antioxidants, anti-ageing agents, plasticizers, adhesives, antiozonizers (in particular of the p-phenyldiamine type), waxes, modified resins, fibres (for example Kevlar® pulp), or mixtures thereof.

The above mentioned crosslinkable elastomeric composition may be prepared by mixing the elastomeric base components together with the other additives optionally present, according to the techniques known in the art. The mixing phases may be performed, for example, by using an open mixer of the open-mill type or an internal mixer of the type with tangential rotors (Banbury) or with co-penetrating rotors (Intermix), or in continuous mixers of the Co-Kneader type (Buss), or of the co-rotating or counter-rotating twin-screw type.

DRAWINGS

FIG. 1 shows a view in cross section of a portion of a tyre.

DETAILED DESCRIPTION OF THE INVENTION

The present invention shall be illustrated in further detail by means of an illustrative embodiment with reference to the attached FIG. 1.

"a" indicates an axial direction and "r" indicates a radial direction. For simplicity, FIG. 1 shows only part of the tyre, the remaining part not shown being identical and arranged symmetrically with respect to the radial direction "r".

The reference number 1 in FIG. 1 indicates a tyre for vehicle wheels, which generally comprises a carcass structure 2 comprising at least one carcass ply 3 having respectively opposite end strips secured to respective annular anchoring structures 4, optionally associated with the elastomeric fillers 4a, incorporated into the zones 5 usually identified by the name "beads".

The carcass structure 2 is associated with a belt structure 6 comprising one or more belt layers 6a, 6b located in radial superpositions relative to each other and relative to the carcass ply 3, having reinforcing cords that are typically metallic. These reinforcing cords may have a crossed orientation relative to a circumferential direction of the tyre 1. The term "circumferential" direction means a direction generically given according to the direction of rotation of the tyre, or at least slightly inclined relative to the direction of rotation of the tyre.

A tread band 7 made of elastomeric mixture is applied in a radially outer position with respect to the belt structure 6, as are other constituent semi-finished parts of the tyre 1.

Respective side walls 8 made of elastomeric mixture are also applied in axially outer position on the side surfaces of the carcass structure 2, each extending from one of the side edges of the tread band 7 up to the respective annular structure for anchoring to the beads 5.

A radially inner surface of the tyre 1 is also preferably internally lined with a layer of elastomeric material that is substantially impermeable to air, referred to as the liner 9.

The belt structure 6 also comprises at least one reinforcing layer 6c that is radially outer with respect to the belt layers 6a, 6b. The radially outer reinforcing layer 6c comprises textile or metal cords, arranged at a substantially zero angle relative to the circumferential direction of the tyre and immersed in the elastomeric material. Preferably, the cords are arranged substantially parallel and side by side to form a plurality of coils. These coils are substantially oriented in the circumferential direction (typically with an angle of between 0° and 5°), this direction usually being said "zero degrees" with reference to its position relative to the equatorial plane X-X of the tyre. The term "equatorial plane" of the tyre means a plane perpendicular to the axis of rotation of the tyre and which subdivides the tyre into two symmetrically equal parts.

Preferably, but not exclusively, the tyre 1 for motor vehicles is of the HP (High Performance) or UHP (Ultra-High-Performance) type, i.e. it is a tyre that is capable of withstanding maximum speeds of at least 190 km/h, up to over 300 km/h. Examples of such tyres are those belonging to the classes "T", "U", "H", "V", "ZR", "W", "Y".

The manufacture of the tyre 1 as described above is performed by assembling respective semi-finished parts on a moulding drum, not shown, performed by at least one assembling device.

At least a part of the components intended to form the carcass structure 2 of the tyre 1 is constructed and/or assembled on the moulding drum. More particularly, the moulding drum serves to receive first the optional liner 9, and then the carcass ply 3. Next, devices, not shown, engage coaxially around each of the end strips one of the annular anchoring structures 4, position an outer sleeve comprising the belt structure 6 and the tread band 7 in a coaxially centred position around the cylindrical carcass sleeve and conform the carcass sleeve in a toroidal configuration by radial dilation of the carcass ply 3, so as to apply it against a radially internal surface of the outer sleeve.

Following the manufacture of the raw tyre 1, a pressing and vulcanization treatment is performed, aimed at establishing structural stabilization of the tyre 1 by crosslinking of the elastomeric mixtures and also to imprint on the tread band 7 a desired tread pattern and to imprint on the side walls 8 optional distinctive graphic signs.

The present invention shall be further illustrated hereinbelow by means of a certain number of preparative examples, which are given for purely indicative purposes and without any limitation of the present invention.

EXAMPLES

Example 1—Synthesis of (Isostyrene/Trans-butadiene) with 72.8% by Weight of Styrene Free of Polyisoprene End Groups (Polymer S1)

50 ml of toluene, styrene (9.06 g; 0.087 mol), butadiene (3.1 g; 0.058 mol; 3 M solution in toluene) and MAO (0.0058 mol; 8 ml; 10 wt % solution in toluene) were placed in a 500 ml round-bottomed flask equipped with a magnetic stirrer, under an inert atmosphere. After bringing the solution to the reaction temperature (T=25° C.), the polymerization was initiated by adding the catalyst of formula 1 described previously (0.006 g; 58 μmol), dissolved in 1 ml of toluene. The mixture was left stirring for 24 hours.

The polymerization was stopped by pouring the contents of the round-bottomed flask into ethanol acidified with HCl and 2,6-di-tert-butyl-4-methylphenol (BHT) as antioxidant.

The coagulated polymer was washed with ethanol, filtered and dried in a vacuum oven at 30-40° C. The yield was 90%. The resulting polymer had a molecular weight of about 329 000 Da with a polydispersity index equal to about 1.8 and a Tg of about −2° C.

Example 2—Synthesis of (Iso-Styrene/Trans-Butadiene):Isoprene-terminated with 65.6% by Weight of Styrene and 0.2% by Weight of Terminal Isoprene (Polymer S2)

50 ml of toluene, isoprene (0.39 g; 0.0058 mol) and MAO (0.0058 mol; 8 ml; solution at 10 wt % in toluene) were placed in a 500 ml round-bottomed flask equipped with a magnetic stirrer, under an inert atmosphere. After bringing the solution to the reaction temperature (T=25° C.), the polymerization was initiated by adding the catalyst of formula 1 (0.006 g; 58 μmol), dissolved in 1 ml of toluene. The mixture was left stirring for 2 hours. Next, styrene (9.06 g; 0.087 mol) and butadiene (3.1 g; 0.058 mol; 3M solution in toluene) were added to the reaction mixture. The mixture was left stirring for a further 24 hours.

The polymerization was stopped by pouring the contents of the round-bottomed flask into ethanol acidified with HCl and 2,6-di-tert-butyl-4-methylphenol (BHT) as antioxidant.

The coagulated polymer was washed with ethanol, filtered and dried in a vacuum oven at 30-40° C. The yield was 80%. The resulting polymer had a molecular weight of about 284 000 Da with a polydispersity index equal to about 1.7 and a Tg of about −1.6° C.

Example 3—Preparation of the Elastomeric Compositions

The elastomeric compositions illustrated in Table 1 below were prepared using a styrene-indene resin (Novares TT90, Ruetgers GmbH), a thermoplastic ottylphenolic resin (SP1068, Si Group) and the polymers S1-S2 having the characteristics described above. Composition R1, used as first reference, is free of additives. Composition R2, used as second reference, comprises 5 phr of polymer S1, free of terminal isoprene. The composition used in the tread of a tyre according to the invention I1 comprises 5 phr of polymer S2. The comparative compositions C1 and C2 comprise 5 phr of thermoplastic ottylphenolic resin and styrene-indene resin, respectively.

All the components, with the exception of the vulcanizing agents and accelerators were mixed together for about 5 minutes in a 50 ml Brabender® closed mixer, the rotors being maintained at a spin speed of 60 rpm and the temperature being maintained at about 145° C. (first phase). At the end, the elastomeric composition was discharged and left to stand for a few hours at room temperature. The vulcanizing agents and accelerators were then added and mixing was again performed in a 50 ml Brabender® closed mixer, the rotors being maintained at a spin speed of about 30 rpm and the temperature being maintained at about 50° C. (second phase). Finally, the elastomeric composition was vulcanized in suitable moulds with a steam press at a temperature of 170° C. for 10 minutes.

All the quantities in Table 1 are expressed in phr.

TABLE 1

|  | Mixtures | | | | |
| --- | --- | --- | --- | --- | --- |
|  | R1 | R2 | I1 | C1 | C2 |
| FIRST PHASE | | | | | |
| S-SBR HP2 | 110 | 110 | 110 | 110 | 110 |
| NR | 20 | 20 | 20 | 20 | 20 |
| Corax HP160 | 4 | 4 | 4 | 4 | 4 |
| S1 | — | 5 | | | |
| S2 | — | | 5 | | |
| SP1068 | — | | | 5 | |
| Novares TT90 | — | | | | 5 |
| Zeosil 1165 | 50 | 50 | 50 | 50 | 50 |
| TESPT | 4 | 4 | 4 | 4 | 4 |
| Stearic acid | 2 | 2 | 2 | 2 | 2 |
| SECOND PHASE | | | | | |
| ZnO | 2.5 | 2.5 | 2.5 | 2.5 | 2.5 |
| 6PPD | 2 | 2 | 2 | 2 | 2 |
| CBS | 1.8 | 1.8 | 1.8 | 1.8 | 1.8 |
| Sulfur | 1.5 | 1.5 | 1.5 | 1.5 | 1.5 |

S-SBR HP2: solution of styrene-butadiene rubber in TDAE oil, comprising 25% by weight of styrene and 37.5% by weight of oil, produced by Lanxess Deutschland GmbH, Germany
NR: natural rubber SIR 20
Corax HP160: carbon black with a high specific surface area produced by Evonik Degussa GmbH, Germany
Novares TT90: styrene-indene resin produced by Reutgers Germany GmbH, Germany
Zeosil 1165: precipitated silica with a BET surface area equal to about 165 m²/g (Rhône-Poulenc)
TESPT: bis(3-triethoxysilylpropyl) tetrasulfide (Degussa-Hüls);
6PPD (antioxidant): N-(1,3-dimethylbutyl)-N'-phenyl-p-phenylenediamine
CBS (accelerator): N-(cyclohexyl-2-benzothiazylsulfenamide, produced by Lanxess Deutschland GmbH, Germany Example 4—Characterization of the Elastomeric Compositions The characteristics of each elastomeric composition were evaluated as described below and the results are collated in Table 2 below.

The static mechanical properties (load at 10%, 50%, 100% and 300% of elongation, referred to as CA01, CA05, CA1, CA3, respectively, tensile strength and elongation at break) were measured according to the standard ISO 37:2005, on samples of the previously described elastomeric compositions crosslinked at 170° C. for 10 minutes.

The dynamic mechanical properties were measured with a dynamic tensile testing machine of servo-hydraulic type in traction-compression mode according to the following methods. A sample of the crosslinked (at 170° C., for 10 minutes) elastomeric composition of cylindrical form (length=25 mm; diameter=12 mm), pre-compression loaded up to 25% of longitudinal deformation relative to the initial length, and maintained at the preset temperature (100° C.) throughout the test, was subjected to a dynamic sinusoidal elongation having an amplitude of ±3.5% relative to the length under preloaded conditions, with a frequency of 100 Hz. The dynamic mechanical properties are expressed in terms of the dynamic elastic modulus (E') and loss factor values (Tan δ). The Tan δ value is calculated in the present case as the ratio between the viscous modulus (E") and the elastic modulus (E').

TABLE 2

| REFERENCE | ELASTOMERIC COMPOSITION | | | | |
| --- | --- | --- | --- | --- | --- |
| PARAMETERS | R1 | R2 | I1 | C1 | C2 |
| STATIC MECHANICAL PROPERTIES | | | | | |
| CA01 [MPa] | 0.27 | 0.32 | 0.34 | 0.32 | 0.28 |
| CA05 [MPa] | 0.7 | 0.85 | 0.95 | 0.79 | 0.7 |
| CA1 [MPa] | 1.3 | 1.57 | 1.65 | 1.31 | 1.17 |
| CA3 [MPa] | 6.99 | 7.56 | 6.91 | 3.09 | 5.49 |
| Tensile strength [MPa] | 15.2 | 12.73 | 18.97 | 17.42 | 18.67 |
| Elongation at break [%] | 495.39 | 446.17 | 587.25 | 605.02 | 650.24 |
| Energy [J/cm³] | 29.8 | 23.78 | 44.25 | 43.04 | 46.54 |
| DYNAMIC MECHANICAL PROPERTIES | | | | | |
| E' (0° C.) at 100 Hz [MPa] | 6.481 | 9.788 | 10.417 | 10.259 | 10.058 |
| E' (23° C.) at 100 Hz [MPa] | 4.017 | 5.141 | 5.825 | 5.325 | 4.833 |
| E' (70° C.) at 100 Hz [MPa] | 2.855 | 3.511 | 4.015 | 3.561 | 3.305 |
| E' (100° C.) at 100 Hz [MPa] | 2.811 | 3.298 | 3.787 | 3.448 | 3.184 |
| ΔE' (0° C.-100° C.) at 100 Hz [MPa] | 3.670 | 6.490 | 6.630 | 6.811 | 6.874 |
| Tanδ (0° C.) at 100 Hz | 0.717 | 0.81 | 0.746 | 0.871 | 0.915 |
| Tanδ (23° C.) at 100 Hz | 0.332 | 0.346 | 0.332 | 0.357 | 0.371 |
| Tanδ (70° C.) at 100 Hz | 0.085 | 0.112 | 0.112 | 0.112 | 0.115 |
| Tanδ (100° C.) at 100 Hz | 0.067 | 0.087 | 0.089 | 0.086 | 0.092 |

According to the Applicant's experience, the parameters that best predict the road behaviour of a tyre are the dynamic-mechanical properties of the elastomeric compositions, in particular the elastic modulus or storage modulus (E'), the viscous modulus or dissipative modulus (E") and the ratio between the viscous modulus and the elastic modulus, known as the tangent delta (Tan δ), which is an indicator of the hysteretic behaviour, and the static-mechanical properties of the elastomeric compositions, in particular the load at various levels of elongation, the tensile strength and the percentage of elongation at break.

As regards the dynamic-mechanical properties, the Applicant considers that a high Tan δ value at low temperatures (about 0° C.) ensures good road holding on wet ground, whereas a high Tan δ value at high temperatures (about 100° C.) ensures good road holding when the tyre is used under particularly extreme driving conditions. In addition, to have a low driving resistance of the motor vehicle, i.e. to have a low rolling resistance, and consequently low fuel consumption, the Tan δ value in the temperature range between 23° C. and 70° C. should be as low as possible. Finally, the elastic modulus (E') undergoes an inevitable reduction in value due to the temperature effects, but the variation should be as limited as possible, so that at low temperature values (typically at 0° C.) the value should not be excessively high, whereas at high temperatures, the value should be as high as possible.

As regards the static-mechanical properties, the Applicant considers that high load values at various levels of elongation and at break give good resistance to laceration and reduction of abrasion. At the same time, to maintain good rigidity, the elongation at break value should not be too high.

The results of Table 2 showed that the elastomeric composition I1 comprising the copolymer as described above had on the whole better mechanical properties, both static and dynamic, relative to the reference elastomeric compositions R1 and R2 and to the comparative elastomeric compositions C1 and C2.

In point of fact, as regards the static mechanical properties, the elastomeric composition I1 showed high load values at each level of elongation (CA01, CA05, CA1, CA3), comparable with and even better than those obtained with the reference compositions R1 and R2, and decidedly better than those obtained with compositions C1 and C2, in which the addition of the resins brings about a drastic drop in the values.

At the same time, the tensile strength and the elongation at break showed optimum values, with a significant improvement relative to the values obtained with the reference compositions R1 and R2, and comparable to those obtained with compositions C1 and C2.

The surprising result of I1 may give a tyre comprising a tread made with such compositions good resistance to laceration, accompanied by good rigidity and less abrasion, with consequent improved durability of the tyre.

On the other hand, as regards the dynamic mechanical properties, the elastomeric composition I1 showed overall elastic modulus (E') values that were higher than the value for the reference R1, but above all composition I1 showed a surprisingly high E' value at 100° C. The surprising result of I1 may give a tyre comprising a tread made with such a composition optimum performance at high speed.

In addition, the elastomeric composition I1 surprisingly showed high Tan δ values at both low (0° C.) and high (100° C.) temperatures, higher than those obtained by R1 and comparable to those obtained with C1 and C2, giving good grip of the tyre both on wet terrain and under particularly difficult driving conditions, and at the same time optimum Tan δ values in the temperature range between 23° C. and 70° C., comparable to those for R1 and R2, giving the tyre low rolling resistance, and consequently low fuel consumption.

The invention claimed is:

1. A (iso-styrene/trans-butadiene): diene-terminated copolymer, wherein said copolymer consists in (i) a polymeric block of styrene-butadiene consisting of a random sequence of butadiene in trans conformation and styrene in isotactic configuration, and (ii) a terminal polymeric block consisting of a sequence of one or more dienic monomers.

2. A copolymer according to claim 1, wherein said dienic monomer is selected from the group comprising isoprene, 1,4-pentadiene, 1,4-hexadiene, 1,5-hexadiene, cyclopentadiene, 1-vinyl-cyclopentene, 2-vinyl-cyclohexene, 4-vinyl-cyclohexene, and mixtures thereof.

3. A copolymer according to claim 2, wherein said dienic monomer is selected from the group comprising isoprene, 1,4-hexadiene, cyclopentadiene, and mixtures thereof.

4. A copolymerization process of styrene and butadiene with one or more dienic monomers comprising (i) to prepare a solution of said one or more dienic monomers in a suitable solvent, (ii) to add to said solution a homogeneous catalytic system, and (iii) to add to said solution said styrene and butadiene, wherein said homogeneous catalytic system comprises a homogeneous catalyst having the following formula (I),

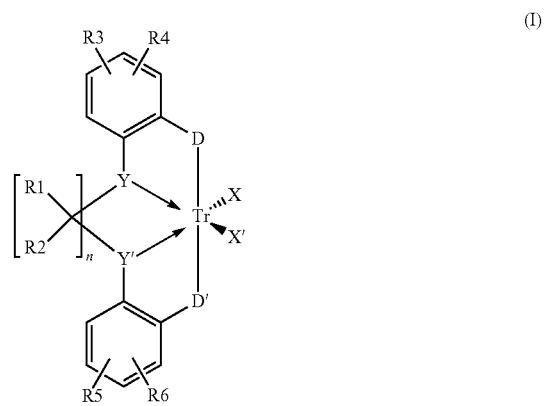

wherein
Tr is a transition metal,
X and X', equal or different each other, are a halogen atom,
R1 and R2, equal or different each other, are a H atom or a linear or branched alkyl group having from 1 to 10 carbon atoms,
R3 to R6, equal or different each other, are a H atom or a linear or branched alkyl group having from 1 to 10 carbon atoms, or a linear or branched arylalkyl group having from 7 to 14 carbon atoms,
Y and Y', equal or different each other, are an oxygen, sulphur, selenium or tellurium atom, or a NR7 or PR7 group,
D and D', equal or different each other, are an oxygen, sulphur, selenium or tellurium atom, or a NR7 or PR7 group,
R7 is a H atom or a linear or branched alkyl group having from 1 to 10 carbon atoms, and
n is an integer from 1 to 10,
and wherein said copolymerization process provides the formation of a (iso-styrene/trans-butadiene): diene-terminated copolymer, wherein said copolymer consists in (i) a polymeric block of styrene-butadiene consisting of a random sequence of butadiene in trans conformation and styrene in isotactic configuration, and (ii) a terminal polymeric block consisting of a sequence of one or more dienic monomers.

5. The copolymerization process according to claim 4, wherein R4 and R6 are linked to the benzene ring in ortho position with respect to the D and D' substituent, and R4 and R6 are represented by a linear or branched arylalkyl group having from 7 to 14 carbon atoms, and R3 and R5 are linked to the benzene ring in para position with respect to the D and D' substituent, and R3 and R5 are represented by a hydrogen atom or a linear or branched alkyl group having from 1 to 10 carbon atoms.

6. The copolymerization process according to claim 4, wherein said homogeneous catalyst is represented by the following formula (1):
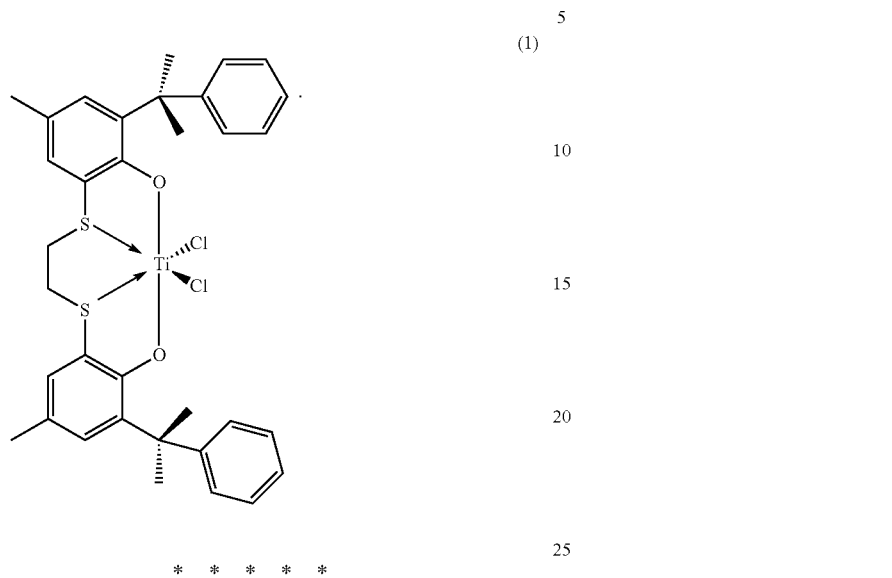
* * * * *